United States Patent
Tonti et al.

(10) Patent No.: US 12,146,385 B2
(45) Date of Patent: Nov. 19, 2024

(54) TOE VALVE

(71) Applicant: INNOVEX DOWNHOLE SOLUTIONS, INC., Houston, TX (US)

(72) Inventors: Nick Tonti, Houston, TX (US); Anthony Rushing, Houston, TX (US)

(73) Assignee: INNOVEX INTERNATIONAL, INC., Humble, TX (US)

( * ) Notice: Subject to any disclaimer, the term of this patent is extended or adjusted under 35 U.S.C. 154(b) by 127 days.

(21) Appl. No.: 18/048,168

(22) Filed: Oct. 20, 2022

(65) Prior Publication Data

US 2024/0133265 A1 Apr. 25, 2024
US 2024/0229600 A9 Jul. 11, 2024

(51) Int. Cl.

| E21B 34/06 | (2006.01) |
|---|---|
| E21B 43/26 | (2006.01) |
| E21B 47/06 | (2012.01) |
| F16K 17/02 | (2006.01) |
| F16K 17/14 | (2006.01) |

(52) U.S. Cl.
CPC .............. *E21B 34/06* (2013.01); *E21B 43/26* (2013.01); *E21B 47/06* (2013.01); *F16K 17/025* (2013.01); *F16K 17/14* (2013.01); *Y10T 137/8811* (2015.04)

(58) Field of Classification Search
CPC .......... E21B 34/06; E21B 43/26; E21B 47/06; Y10T 137/8811
USPC .......................................................... 251/12
See application file for complete search history.

(56) References Cited

U.S. PATENT DOCUMENTS

| 3,973,630 | A * | 8/1976 | Wheeler ............... E21B 43/121 166/105.3 |
|---|---|---|---|
| 7,082,991 | B2 * | 8/2006 | Sommers .............. E21B 33/129 166/134 |
| 7,267,172 | B2 * | 9/2007 | Hofman .................. E21B 43/00 166/308.1 |
| 7,377,322 | B2 * | 5/2008 | Hofman ................ E21B 43/261 166/120 |
| 7,926,571 | B2 * | 4/2011 | Hofman .................. E21B 43/26 166/373 |
| 8,267,178 | B1 * | 9/2012 | Sommers .............. E21B 34/103 166/334.4 |

(Continued)

FOREIGN PATENT DOCUMENTS

| WO | WO-2015179100 A1 * | 11/2015 | ............. E21B 23/04 |
|---|---|---|---|
| WO | WO-2022256504 A1 * | 12/2022 | ............. E21B 17/18 |

*Primary Examiner* — Craig M Schneider
*Assistant Examiner* — Frederick D Soski
(74) *Attorney, Agent, or Firm* — MH2 Technology Law Group, LLP

(57) ABSTRACT

A downhole tool includes a body defining a bore axially therethrough and a port in communication with the bore and extending radially through the body, an inner cap positioned in the port, the inner cap sealing the port, and an outer cap positioned in the port. The outer cap is spaced apart from the inner cap, and the outer cap seals the port, such that a chamber is defined between the inner and outer caps in the port. The inner cap is configured to move toward outer cap in response to a first pressure differential between bore and the chamber across the outer cap. The inner cap is configured to dislodge the outer cap from the port in response to the inner cap engaging the outer cap and a second pressure differential between the bore and an exterior of the downhole tool being reached across the inner cap.

22 Claims, 6 Drawing Sheets

(56) References Cited

U.S. PATENT DOCUMENTS

| | | | |
|---|---|---|---|
| 8,499,841 B2 * | 8/2013 | Tinker | E21B 33/134 |
| | | | 166/377 |
| 8,863,850 B2 * | 10/2014 | Sherman | E21B 43/114 |
| | | | 166/305.1 |
| 9,133,684 B2 * | 9/2015 | Hofman | E21B 34/103 |
| 9,441,440 B2 * | 9/2016 | Hofman | E21B 23/00 |
| 9,458,698 B2 * | 10/2016 | Harris | E21B 34/14 |
| 9,476,282 B2 | 10/2016 | Anton et al. | |
| 9,567,832 B2 * | 2/2017 | Hofman | E21B 34/103 |
| 9,611,719 B2 * | 4/2017 | Hofman | E21B 34/10 |
| 9,835,010 B2 | 12/2017 | Anton et al. | |
| 10,107,072 B2 | 10/2018 | Harris et al. | |
| 10,174,590 B2 | 1/2019 | Kellner | |
| 10,683,728 B2 * | 6/2020 | Kellner | E21B 17/08 |
| 10,995,583 B1 * | 5/2021 | Helms | E21B 34/063 |
| 11,136,855 B2 * | 10/2021 | VanLue | E21B 33/128 |
| 11,208,868 B2 * | 12/2021 | Marya | E21B 34/063 |
| 11,891,877 B1 * | 2/2024 | Crews | E21B 34/103 |
| 2013/0105175 A1 * | 5/2013 | Mailand | E21B 34/06 |
| | | | 166/373 |
| 2013/0126152 A1 * | 5/2013 | Banks | E21B 34/063 |
| | | | 166/177.5 |
| 2016/0168949 A1 * | 6/2016 | Anton | E21B 34/14 |
| | | | 166/321 |
| 2016/0177667 A1 * | 6/2016 | Kellner | E21B 34/12 |
| | | | 166/321 |
| 2017/0067328 A1 * | 3/2017 | Chauffe | C09K 8/62 |
| 2024/0133265 A1 * | 4/2024 | Tonti | E21B 34/06 |

\* cited by examiner

TOE VALVE

BACKGROUND

Subterranean wells are constructed as part of the oil and gas production process. As part of the well construction process, casing may be installed in the well to "complete" a section of the well. Completing the well can be an iterative process, whereby a section of a well is drilled and completed, and then another section is drilled. Cement is frequently used to secure the casing in place in the well. Generally, cement is pumped through the wellbore, and then into an annulus defined radially between the casing and the earthen wellbore wall. The casing may be permitted to set in the annulus, thereby securing the casing in place in the well.

Cementing operations often include wiping the wellbore. To wipe the wellbore, a wiper device such as a wiper plug, dart, or ball is pumped down the string through which the cement is pumped. Such wiper devices can lead the cement, follow it, or both. The wiper device may be desired as a barrier to prevent cement contaminating wellbore fluids and to remove excess cement from the string.

After cementing, the wellbore may be reopened downhole to permit circulation of additional wellbore fluids, e.g., for hydraulic fracturing or other processes. A toe valve is a downhole tool that permits such selective opening of the string after cementing. A variety of different toe valve designs are known, but generally permit a pressurized fluid to open a valve element (e.g., a sliding sleeve) downhole, and establish fluid communication radially outward through the valve. A challenge with toe valves is that they may fail, resulting in the radial outward flowpath being at least partially obstructed. Cement left behind in the tool, for example, can present such a risk of obstruction, or sleeves can become stuck and fail to open, etc.

SUMMARY

Embodiments of the disclosure include a downhole tool that includes a body defining a bore axially therethrough and a port in communication with the bore and extending radially through the body, an inner cap positioned in the port, the inner cap sealing the port, and an outer cap positioned in the port. The outer cap is spaced apart from the inner cap, and the outer cap seals the port, such that a chamber is defined between the inner and outer caps in the port. The inner cap is configured to move toward outer cap in response to a first pressure differential between bore and the chamber across the outer cap. The inner cap is configured to dislodge the outer cap from the port in response to the inner cap engaging the outer cap and a second pressure differential between the bore and an exterior of the downhole tool being reached across the inner cap.

Embodiments of the disclosure include a method including inserting a valve assembly comprising an outer cap and an inner cap into a radially-extending port of a downhole tool, such that the inner and outer caps block the port, deploying the downhole tool into a wellbore, performing one or more procedures in the wellbore after deploying the downhole tool, while the inner and outer caps are blocking the port, applying a pressure to the downhole tool, such that the inner and outer caps are ejected from the port, and performing one or more operations in the wellbore through the port after the inner and outer caps are ejected from the port.

Embodiments of the disclosure include a valve assembly for a downhole tool, the valve assembly including an outer cap received into a port extending radially through the downhole tool, an inner cap received into the port and spaced apart from the outer cap such that a chamber is defined between and at least partially by the inner and outer caps in the port, and an inner retainer that holds the inner cap in the port. The inner retainer is configured to yield in response to applying a predetermined pressure to the outer cap, such that the inner cap moves toward and collides with the outer cap. The valve assembly also includes an outer retainer that holds the outer cap in the port. The outer retainer is configured to yield at least partially in response to the inner cap colliding with the outer cap, such that the inner and outer caps are ejected from the port in response to the application of the predetermined pressure.

BRIEF DESCRIPTION OF THE DRAWINGS

The present disclosure may best be understood by referring to the following description and accompanying drawings that are used to illustrate embodiments of the invention. In the drawings.

DETAILED DESCRIPTION

Figure 1:
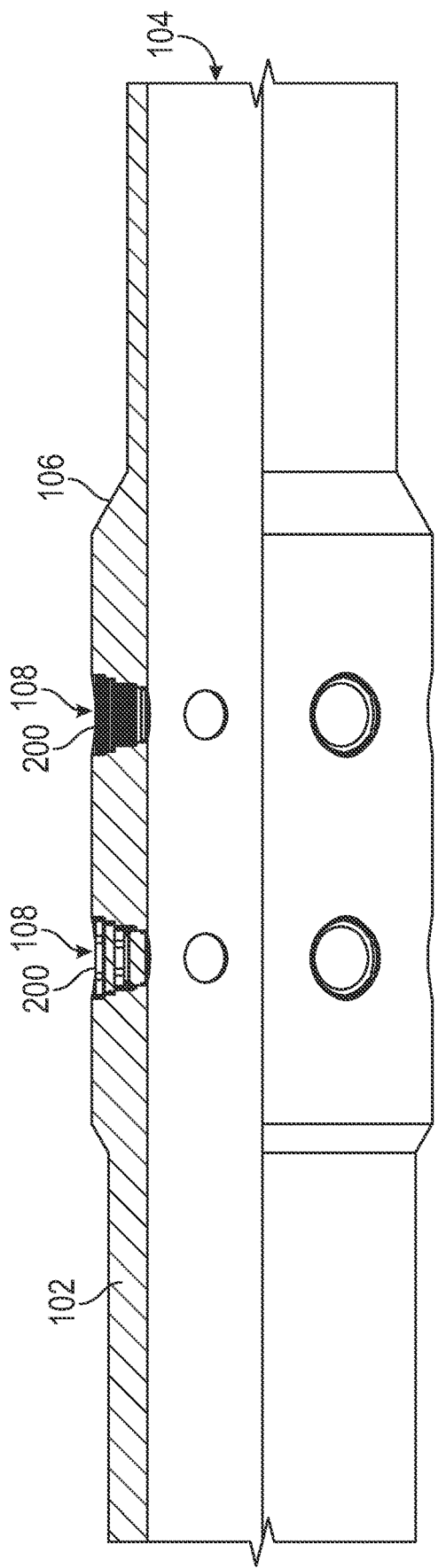
FIG. 1 illustrates a half-sectional, side view of a downhole tool including ports and valve assemblies, according to an embodiment.

The following disclosure describes several embodiments for implementing different features, structures, or functions of the invention. Embodiments of components, arrangements, and configurations are described below to simplify the present disclosure; however, these embodiments are provided merely as examples and are not intended to limit the scope of the invention. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Finally, the embodiments presented below may be combined in any combination of ways, e.g., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. In addition, unless otherwise provided herein, "or" statements are intended to be non-exclusive; for example, the statement "A or B" should be considered to mean "A, B, or both A and B."

FIG. 1 illustrates a side, half-sectional view of a downhole tool 100, according to an embodiment. The downhole tool 100 may be, for example, a toe valve, which may be connected to a string of tubulars and run into a wellbore to support cementing, fracturing, and other operations. In other embodiments, the downhole tool 100 may be a different type of tool for use in a wellbore.

The downhole tool 100 may include a body 102, which may be generally cylindrical and may define a bore 104 in an axial direction therethrough. The body 102 may be configured to be connected on either end to tubulars, as part of the aforementioned string that is deployed into the well. For example, the ends of the body 102 may include threaded connections. The body 102 may include a radially-enlarged central portion 106, in which one or more (e.g., a plurality) of ports 108 are defined. The ports 108 extend radially through the body 102, i.e., they extend from and are in communication with the bore 104 and extend to and are in communication with an exterior of the tool 100, e.g., an annulus of the well. Several ports 108 may be provided as shown, and may be distributed in one, two, or more axially-aligned rows at uniform circumferential intervals. In other embodiments, the ports 108 may be disposed in any other arrangement or pattern.

Valve assemblies 200 may be disposed in the ports 108, at least initially, during run-in and, e.g., during initial phases of tool 100 use in the wellbore (e.g., during casing testing). In the illustrated state, each valve assembly 200 blocks fluid flow through a respective one of the ports 108 in which it is disposed, such that fluid flows axially through the body 102 via the bore 104, but not radially through the ports 108. Upon reaching a desired pressure in the bore 104, the valve assemblies 200 may be ejected from within the ports 108, thereby opening the ports 108 to radial-outward fluid flow. In at least some embodiments, such ejection may not rely on the valve assemblies 200 breaking apart, as with a frangible rupture disk. Further, the valve assemblies 200 may release without relying on sliding sleeves or other parts that may be prone to fouling or otherwise fail to move in the presence of cement or other particulate matter. Additionally, the presence of several ports 108 may provide for several opportunities for radial fluid flow to be permitted, even if one or more of the ports 108 were to remain blocked, e.g., by the valve assemblies 200 therein becoming blocked. In other embodiments, the valve assemblies 200 may be used in combination with such sliding sleeves and/or frangible disks.

Figure 2:
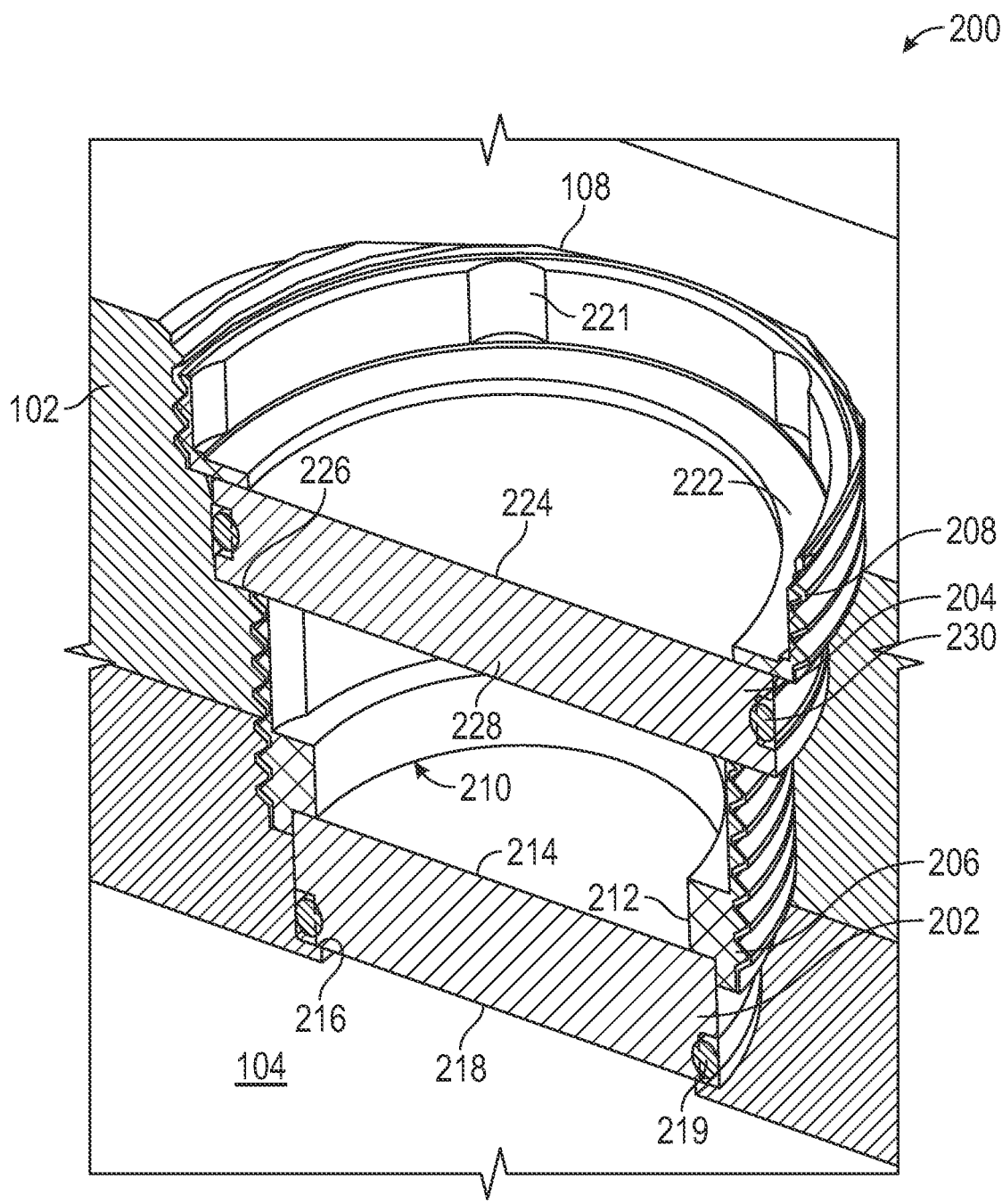
FIG. 2 illustrates a perspective view of a section of one of the ports and one of the valve assemblies, according to an embodiment.

FIG. 2 illustrates a sectional view of one of the ports 108 and one of the valve assemblies 200, according to an embodiment. It will be appreciated that the other ports 108 and other valve assemblies 200 may be the same or similar. The port 108 may extend radially from the bore 104, as noted above, e.g., perpendicular to a central longitudinal axis of the tool 100. Further, the individual port 108, as shown, may be generally cylindrical, and thus may have a central axis that may be perpendicular to the central axis of the tool 100.

As shown, the valve assembly 200 may include a first or "inner" cap 202, a second or "outer" cap 204, a first or "inner" retainer 206, and a second or "outer" retainer 208. The inner cap 202 may be positioned at the inner end of the port 108, between the bore 104 and the inner retainer 206. The outer cap 204 may be positioned near the outer end of the port 108, between the outer retainer 208 and the inner retainer 206. The inner cap 202 is thus inward of the outer cap 204 in the port 108, e.g., axially offset along the central axis of the port 108, and radially closer to the bore 104 than the outer cap 204. Further, the inner and outer caps 202, 204 may be separated apart, defining a chamber 210 therebetween. In at least some embodiments, the chamber 210 may be held at atmospheric pressure, or any other pressure that is generally lower than the pressures experienced in the downhole environment.

The inner retainer 206 may be threaded into the port 108 and may include a lip 212 that extends radially inwards (toward the central axis of the port 108) and engages an outer surface 214 of the inner cap 202. Further, the port 108 may define a ledge 216 that also extends radially inwards (toward the central axis of the port 108) and engages an inner surface 218 of the inner cap 202. Accordingly, the inner cap 202 may be entrained between the lip 212 and the ledge 216, such that the inner retainer 206 holds the inner cap 202 in the port 108. A seal 219 may be positioned around the inner cap 202 and may prevent fluid communication between the bore 104 and the chamber 210. Although not visible, in at least some embodiments, the inner retainer 206 may include recesses formed therein, e.g., for engaging a tool (e.g., wrench) to assist in rotating the retainer 206 into position in the port 108.

Similarly, the outer retainer 208 may be threaded into the port 108 and include a lip 222 that extends radially inward (e.g., toward the central axis of the port 108) and engages an outer surface 224 of the outer cap 204. The port 108 may define a ledge 226 that may also extend radially inwards (e.g., toward the central axis of the port 108) and engages an inner surface 228 of the outer cap 204. Accordingly, the outer cap 204 may be entrained between the lip 222 and the ledge 226, such that the outer retainer 208 holds the outer cap 204 in the port 108. A seal 230 may be positioned around the outer cap 204, may engage the port 108, and may prevent fluid communication between the chamber 210 and the exterior of the tool 100. The outer retainer 208 may include recesses or other features for engaging a tool to assist in rotating the outer retainer 208 into position in the port 108.

The inner cap 202 may be relatively thick and smaller in diameter as compared to the outer cap 204. The port 108 may be contoured with a complementary geometry, e.g., the inner section thereof may be smaller in cross-sectional dimension than the outer section thereof. For example, the diameter of the port 108 may increase, e.g., stepwise, as proceeding radially outward from the bore 104 (e.g., axially along the port 108). As a result of the relative construction of the inner and outer caps 202, 204, the inner cap 202 is relatively stiff in comparison to the outer cap 204. Further, the inner cap 202 may not seal with the port 108 if the inner cap 202 is displaced outward, away from the bore 104, from its current position, e.g., moved into the chamber 210.

The lip 212 of the inner retainer 206 may be relatively thick as compared to the lip 222 of the outer retainer 208. Accordingly, in embodiments in which the inner and outer retainers 206, 208 are made of the same material (e.g., brass or another material that may be configured to shear at a working pressure), the relative thickness may provide for the lip 222 to shear under a lower force than the lip 212. In other embodiments, the inner and outer retainers 206, 208 may be made of different materials, and thus the relative thicknesses may be equal or different, e.g., so that the lip 222 shears under a lower force than the lip 212.

Figure 3:
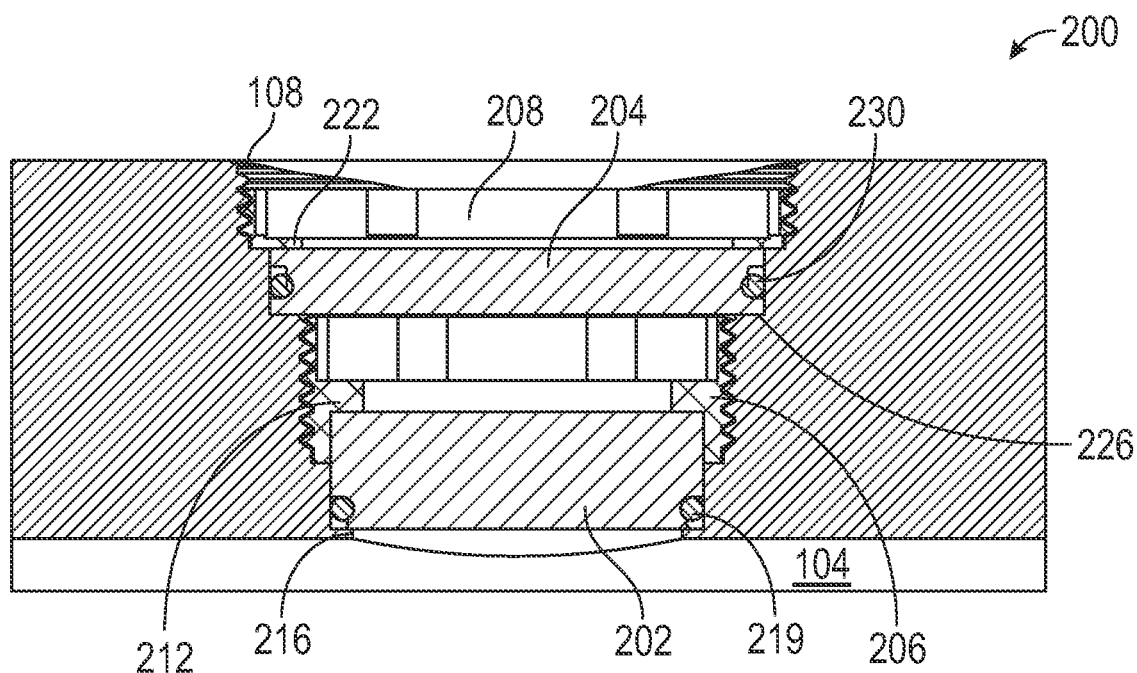
FIG. 3 illustrates a cross-sectional view of the port and the valve assembly, with the valve assembly in an initial configuration, according to an embodiment.

FIGS. 3-6 illustrate a sequence of operation of the valve assembly 200 in the port 108, according to an embodiment. In particular, FIG. 3 illustrates an initial or "run-in" configuration of the valve assembly 200. The initial configuration is the same as the configuration of FIG. 2, with the inner and outer caps 202, 204 held in the port 108 by the inner and outer retainers 206, 208, respectively. As such, the port 108 is blocked. Further, the seals 219, 230 form a sealing engagement between the inner and outer caps 202, 204, respectively, and the port 108, such that the chamber 210 is sealed off and prevented from communication with either the bore 104 or the exterior of the tool 100. This configuration may be used during run-in and to support initial procedures that do not require the port 108 to be open, such as, for example, pressure testing the casing of the well. The pressure experienced in the well during such initial procedures may not be sufficiently greater than the pressure in the chamber 210 so as to dislodge the inner cap 202.

Figure 4:
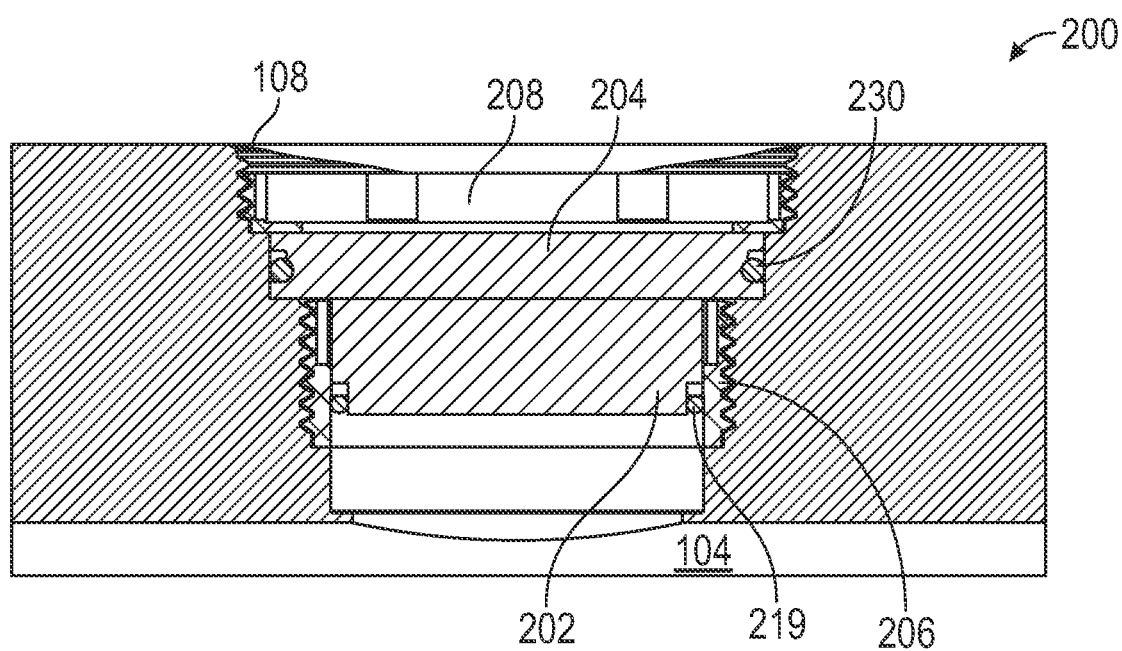
FIG. 4 illustrates a cross-sectional view of the port and the valve assembly, with the valve assembly in a first intermediate configuration, according to an embodiment.

When it is desired to open the port 108, e.g., to support hydraulic fracturing operations, a predetermined pressure may be supplied to the bore 104, e.g., by closing a valve below the tool 100. The predetermined pressure supplied to the bore 104 may cause a pressure differential to be experienced across the inner cap 202, since the chamber 210 may be at a relatively low (e.g., atmospheric) pressure and may still be isolated from pressure within the bore 104 and from pressure exterior to the tool 100. The inner cap 202 is sufficiently robust to survive (e.g., not break apart from) the pressure differential, but the lip 212 may shear under the force generated by the pressure differential. Accordingly, the inner cap 202 may move into the chamber 210, and accelerate into contact with the outer cap 204, thereby moving the valve assembly 200 to its first intermediate configuration. This is shown in FIG. 4 and represents the first intermediate configuration of the valve assembly 200. During this time, the chamber 210 around the inner cap 202 may rapidly fill with fluid from within the bore 104 as the seal 219 may no longer seal with the port 108.

Figure 5:
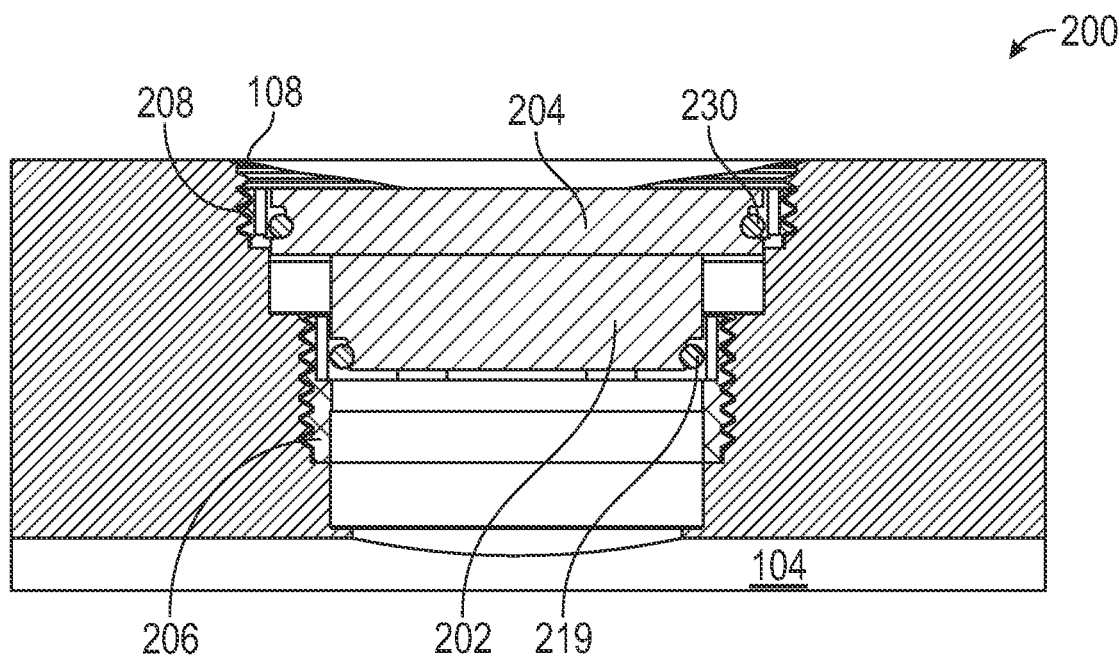
FIG. 5 illustrates a cross-sectional view of the port and the valve assembly, with the valve assembly in a second intermediate configuration, according to an embodiment.
Figure 6:
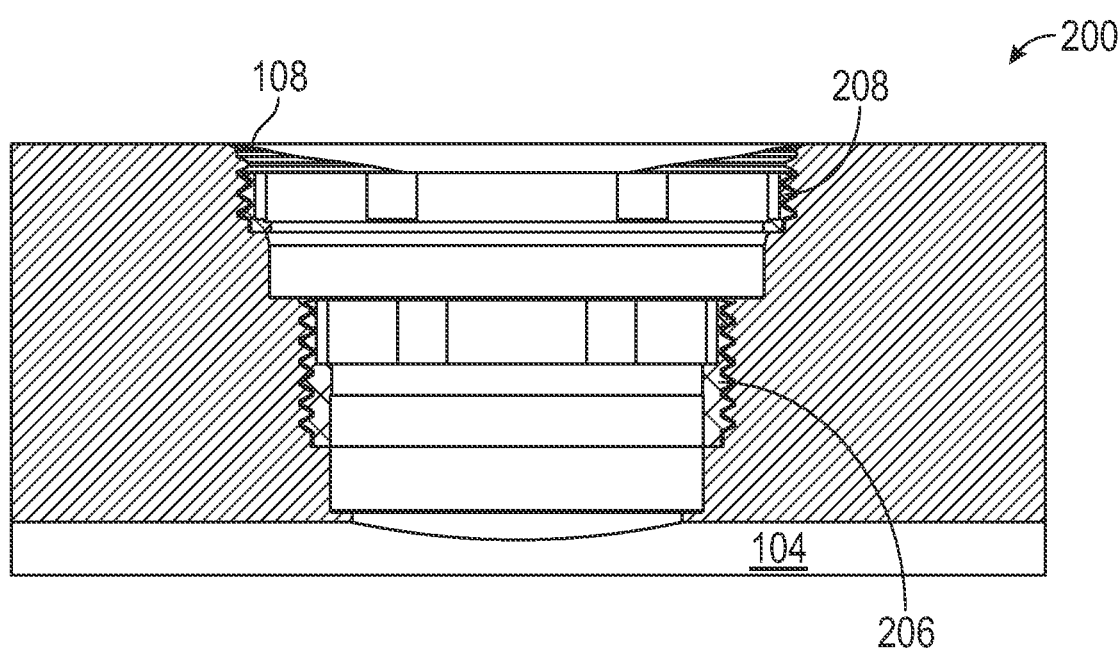
FIG. 6 illustrates a cross-sectional view of the port and the valve assembly, with the valve assembly in an open configuration, and thus the port open, according to an embodiment.

The combination of the impulsive forces generated by the inner cap 202 colliding with the stationary outer cap 204, and the rapid filling of the chamber 210 may be transmitted to the lip 222 by the outer cap 204. The outer cap 204 may be sufficiently robust to survive (e.g., not break apart from) these impulsive forces, but the lip 212 may be configured to shear in response to the forces applied to the outer cap 204, resulting in the valve assembly 200 moving into its second intermediate configuration, as shown in FIG. 5. Once the lip 224 of the outer retainer 208 shears, nothing remains to prevent the inner and outer caps 202, 204 from exiting the port 108 in a radial outward direction (relative to the bore 104, e.g., along the central axis of the port 108) under force of the pressure in the bore 104. Accordingly, as shown in FIG. 6, the caps 202, 204 are ejected from the port 108, and the port 108 is opened to fluid communication in a radial direction between the bore 104 and the exterior of the tool 100. The retainers 206, 208, with lips 212, 222 sheared off, may remain in the port 108 in the open position.

Figure 7:
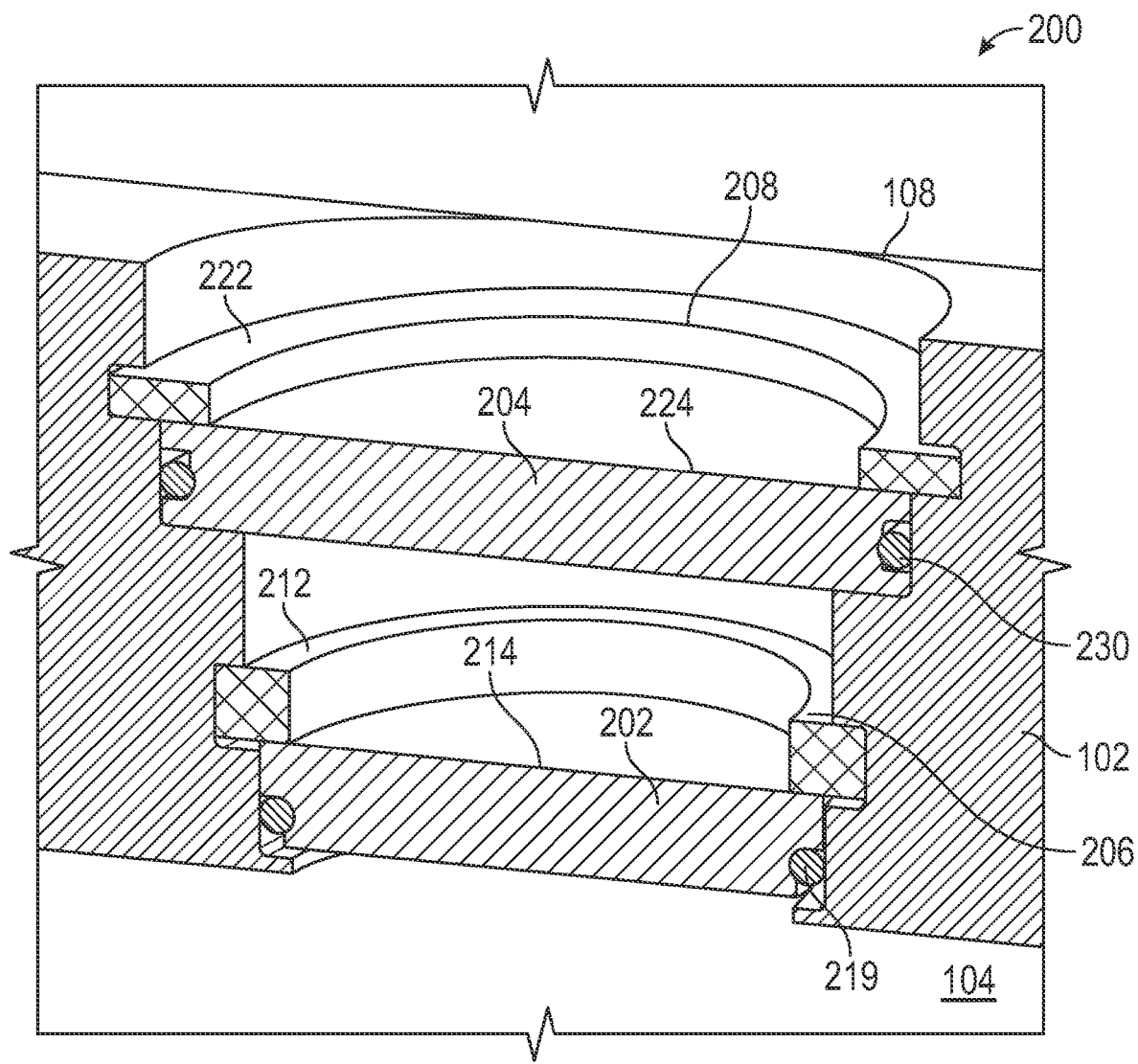
FIG. 7 illustrates a perspective view of a section of a valve assembly and a port of the downhole tool, according to another embodiment.

FIG. 7 illustrates a perspective view of a section of the valve assembly 200 in the port 108, according to another embodiment. In this embodiment, the inner and outer retainers 206, 208 are not threaded into engagement with the port 108. Rather, the inner and outer retainers 206, 208 are fitted into grooves 700, 702 formed in the body 102 surrounding the port 108. The retainers 206, 208 may thus be formed as snap rings, which may be compressed to fit into the respective grooves 700, 702 and then released such that the spring force thereof retains the retainers 206, 208 snugly in the grooves 700, 702. Thus, the retainers 206, 208 may form the lip 212, 222 of the embodiment discussed above, as the portion of the retainers 206, 208 that extends a radially inward from the port 108 and engages the outer surfaces 214, 224 of the inner and outer caps 202, 204, respectively. The retainers 206, 208 (e.g., lips 212, 222, thereof) may thus shear as discussed above and permit the inner and outer caps 202, 204 to be ejected from the port 108.

Figure 8:
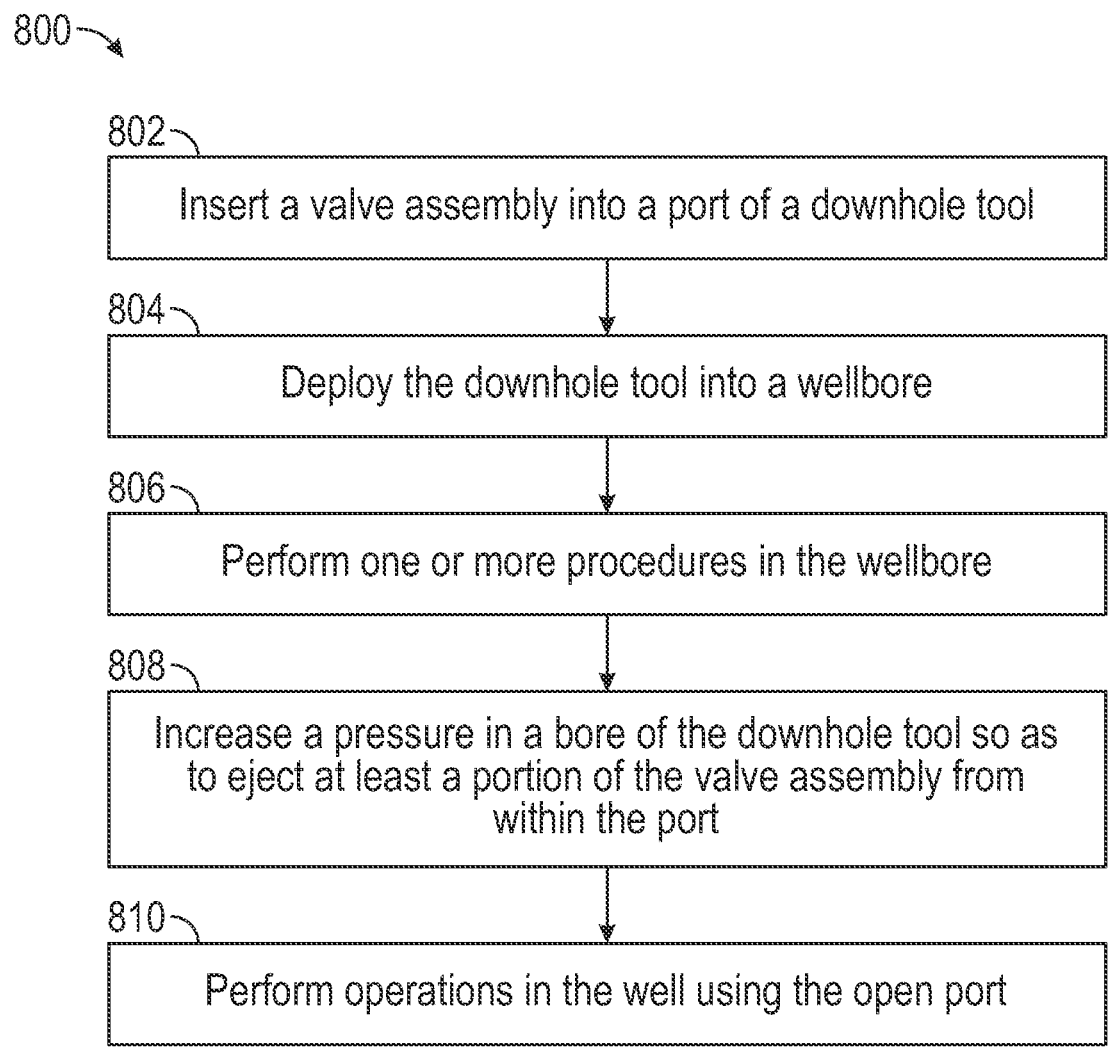
FIG. 8 illustrates a flowchart of a method for operating a downhole tool, according to an embodiment.

FIG. 8 illustrates a flowchart of a method 800 for actuating a downhole tool, according to an embodiment. For example, actuating the downhole tool may include opening one or more of the ports 108 of the downhole tool 100 discussed above. Accordingly, an embodiment of the method 800 is discussed herein with reference to FIGS. 1-7 by way of example. However, other embodiments of the method 800 may employ other structures. Moreover, it will be appreciated that the steps of the method 800 may be performed in the order presented herein, performed in any other order, or performed in parallel. Further, any two or more of the steps may be combined into a single step, or any of the steps may be partitioned into two or more discrete steps, without departing from the scope of the present disclosure.

The method 800 may include inserting a valve assembly 200 into a port 108 of the downhole tool 100, as at 802. For example, this may include inserting a inner cap 202 into the port 108, and then securing a lower retainer 206 therein, such that the lower retainer 206 prevents the inner cap 202 from moving out of the port 108. Next, an outer cap 204 may be placed into the port 108, and separated apart from the inner cap 202 so as to define a chamber 210 therebetween within the port 108. The inner and outer caps 202, 204 may seal with the port 108, thereby restricting fluid communication with the chamber 210 therebetween. The outer cap 204 may be secured in place by inserting an outer retainer 208 into the port 108.

The downhole tool 100 may then be deployed into a wellbore, as at 804, e.g., in the configuration illustrated in FIG. 3. One or more initial procedures, e.g., cementing, casing pressure tests, etc., may be conducted before, during, and after running the downhole tool 100 into the wellbore at 804, as at 806.

The downhole tool 100 may then be actuated, e.g., by opening the port 108. This may proceed by raising the pressure within a bore 104 of the downhole tool 100 to a predetermined actuation pressure, which may eject at least a portion of the valve assembly 200 from within the port 108, as at 808. More particularly, in an embodiment, raising the pressure in the bore 104 may cause the inner cap 202 to shear a lip 212 of the lower retainer 206, as shown in FIG. 4. When this happens, the inner cap 202 may move outward until it collides with the outer cap 204. The fluid of the bore 104, still at the predetermined pressure, may fill the chamber 210 around the inner cap 202, and also collide with the outer cap 204.

The collision forces on the outer cap 204, applied by the inner cap 202 and/or the fluid, may be transmitted by the outer cap 204 to a lip 222 of the outer retainer 208. The lip 222 of the outer retainer 208 may be relatively thin as compared to the lip 212 of the inner retainer 206 that was sheared, and thus the lip 222 may also shear, as shown in FIG. 5. This may release the outer cap 204, and inner and outer caps 202, 204 may together be ejected from within the port 108, leaving the port 108 open, as shown in FIG. 6. Accordingly, the inner and outer caps 202, 204 may not break apart when ejected from the port 108, although one or more both may or may not break apart immediately after being ejected from the port 108 (or any time thereafter), without limitation.

In some cases, portions of the retainers 206, 208 may remain in the port 108 after the inner and outer caps 202, 204 are ejected from the port 108, but in other embodiments, the inner and outer retainers 206, 208 may also be fully ejected from within the port 108. The remaining open port 108 may permit fluid flow radially through a body 102 of the downhole tool 100. Accordingly, one or more operations (e.g., hydraulic fracturing operations) may be performed via the open port 108, as at 810.

As used herein, the terms "inner" and "outer"; "up" and "down"; "upper" and "lower"; "upward" and "downward"; "above" and "below"; "inward" and "outward"; "uphole" and "downhole"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
    inserting a valve assembly into a radially-extending port of a downhole tool, wherein the downhole tool comprises a body defining a bore axially therethrough, and the port is in communication with the bore and extending radially through the body, and wherein the valve assembly comprises:
        an inner cap positioned in the port, the inner cap sealing the port;
        a first shearable retainer retaining the inner cap;
        an outer cap positioned in the port, wherein the outer cap is spaced apart from the inner cap, and wherein the outer cap seals the port, such that a chamber is defined between the inner and outer caps in the port; and
        a second shearable retainer retaining the outer cap;
    deploying the downhole tool into a wellbore;
    performing one or more procedures in the wellbore after deploying the downhole tool, tool while the inner and outer caps are blocking the port;
    applying a pressure to the downhole tool which moves the inner cap toward the outer cap in response to a first pressure differential between bore and the chamber across the outer cap, and subsequently dislodges the outer cap from the port in response to the inner cap engaging the outer cap and a second pressure differential between the bore and an exterior of the downhole tool; and
    performing one or more operations in the wellbore through the port after the inner and outer caps are ejected from the port.

2. The method of claim 1, further comprising retaining the inner cap in the port using the first shearable retainer having a lip that engages the inner cap, wherein the lip yields in response to the pressure.

3. The method of claim 2, further comprising retaining the outer cap in the port using the second shearable retainer having a lip that engages the outer cap, wherein the lip of the outer cap yields at least partially in response to the inner cap colliding with the outer cap in response to the pressure.

4. The method of claim 3, further comprising:
    positioning the first shearable retainer into the port such that the first shearable retainer entrains the inner cap between a ledge of the port and the lip of the first shearable retainer; and
    positioning the second shearable retainer into the port such that that the second shearable retainer entrains the outer cap between a ledge of the port and the lip of the second shearable retainer.

5. The method of claim 4, wherein positioning the first shearable retainer comprises threading the first shearable retainer into the port, and wherein positioning the second shearable retainer comprises threading the second shearable retainer into the port.

6. The method of claim 1, wherein the inner and outer caps do not break apart when ejected from the port.

7. The method of claim 1, wherein applying the pressure moves the inner cap radially outwards within the port and collides with the outer cap.

8. The method of claim 1, wherein the one or more operations performed while the inner and outer caps are in the port comprises casing pressure testing, and wherein the one or more operations performed after the inner and outer caps are ejected comprises hydraulic fracturing.

9. A downhole tool, comprising:
    a body defining a bore axially therethrough and a port in communication with the bore and extending radially through the body;
    an inner cap positioned in the port, the inner cap sealing the port;
    a first shearable retainer retaining the inner cap;
    an outer cap positioned in the port; and
    a second shearable retainer retaining the outer cap,
    wherein the outer cap is spaced apart from the inner cap, and wherein the outer cap seals the port, such that a chamber is defined between the inner and outer caps in the port, wherein the inner cap is configured such that the inner cap moves toward the outer cap in response to a first pressure differential between bore and the chamber across the outer cap, and wherein the inner cap is configured such that the inner cap dislodges the outer cap from the port in response to the inner cap engaging the outer cap and a second pressure differential between the bore and an exterior of the downhole tool.

10. The downhole tool of claim 9, wherein the first shearable retainer is positioned in the port and configured such that the first shearable retainer prevents the inner cap from moving toward the outer cap in the port until the first pressure differential is reached.

11. The downhole tool of claim 10, wherein the first shearable retainer is threaded into the port.

12. The downhole tool of claim 10, wherein the first shearable retainer includes a lip that engages an outer surface of the inner cap, the lip being configured such that the lip shears in response to the first pressure differential being applied across the inner cap.

13. The downhole tool of claim 9, wherein the second shearable retainer is positioned in the port and configured such that the second shearable member prevents the outer cap from moving away from the inner cap and out of the port until the second pressure differential is reached.

14. The downhole tool of claim 13, wherein the second shearable retainer is threaded into the port.

15. The downhole tool of claim 9, wherein the outer cap engages a ledge formed in the body, such that the inner cap is prevented from moving toward the outer cap.

16. The downhole tool of claim 15, wherein the inner cap engages a second ledge formed in the body, such that the inner cap is prevented from moving away from the outer cap.

17. The downhole tool of claim 9, further comprising a first seal positioned between the port and the inner cap, sealing the port with the inner cap and preventing communication between the bore and the chamber.

18. The downhole tool of claim 9, further comprising a second seal positioned between the port and the outer cap, sealing the port with the outer cap and preventing communication between the chamber and the exterior of the downhole tool.

19. A valve assembly for a downhole tool, comprising:

an outer cap received into a port extending radially through the downhole tool;

an inner cap received into the port and spaced apart from the outer cap such that a chamber is defined between and at least partially by the inner and outer caps in the port;

an inner retainer that holds the inner cap in the port, wherein the inner retainer is configured such that the inner retainer yields in response to a predetermined pressure to the inner cap, such that the inner cap moves toward and collides with the outer cap; and an outer retainer that holds the outer cap in the port, wherein the outer retainer is configured such that the outer retainer yields at least partially in response to the inner cap colliding with the outer cap, such that the inner and outer caps are ejected from the port in response to the application of the predetermined pressure.

20. The valve assembly of claim 19, wherein the inner cap, the outer cap, or both are configured such that the inner cap, the outer cap, or both do not break apart prior to being ejected from the port in response to the application of the predetermined pressure.

21. The valve assembly of claim 19, wherein the inner retainer comprises a first shearable lip that engages an outer surface of the inner cap, and wherein the outer retainer comprises a second shearable lip that engages an outer surface of the outer cap.

22. The valve assembly of claim 19, further comprising a first seal coupled to the inner cap and a second seal coupled to the outer cap, wherein the first and second seals are configured such that the first and second seals seal the chamber between the inner and outer caps.

\* \* \* \* \*